United States Patent
Lew

(10) Patent No.: US 7,611,288 B2
(45) Date of Patent: Nov. 3, 2009

(54) PLASTIC QUICK-SNAP CENTERBEARING ISOLATOR MOUNT AND METHOD OF MANUFACTURING AND ASSEMBLING SAME

(75) Inventor: John G. Lew, Fort Wayne, IN (US)

(73) Assignee: Cooper-Standard Automotive Inc., Novi, MI (US)

(*) Notice: Subject to any disclaimer, the term of this patent is extended or adjusted under 35 U.S.C. 154(b) by 478 days.

(21) Appl. No.: 10/561,882

(22) PCT Filed: Jul. 6, 2004

(86) PCT No.: PCT/US2004/021588

§ 371 (c)(1),
(2), (4) Date: Mar. 19, 2007

(87) PCT Pub. No.: WO2005/093272

PCT Pub. Date: Oct. 6, 2005

(65) Prior Publication Data

US 2007/0172167 A1    Jul. 26, 2007

Related U.S. Application Data

(60) Provisional application No. 60/484,740, filed on Jul. 3, 2003.

(51) Int. Cl.
*F16C 27/00* (2006.01)

(52) U.S. Cl. ............... 384/536; 384/585; 29/898.07

(58) Field of Classification Search ............... 384/536, 384/585, 539; 180/381; 29/898.07
See application file for complete search history.

(56) References Cited

U.S. PATENT DOCUMENTS

| | | | |
|---|---|---|---|
| 2,939,748 | A | 6/1960 | Leach |
| 3,309,154 | A | 3/1967 | Stokley |
| 3,639,015 | A | 2/1972 | Maas |
| 3,743,059 | A | 7/1973 | Morse et al. |
| 3,743,365 | A | 7/1973 | Kato |
| 3,961,829 | A | 6/1976 | Bowen et al. |
| 4,083,580 | A | 4/1978 | Shaner |
| 4,722,618 | A | 2/1988 | Matsumoto et al. |
| 5,033,875 | A | 7/1991 | Moulinet |
| 5,208,981 | A | 5/1993 | Puzsik |
| 5,501,531 | A | 3/1996 | Hamaekers |

*Primary Examiner*—Thomas R Hannon
(74) *Attorney, Agent, or Firm*—Fay Sharpe LLP

(57) ABSTRACT

A resilient mount (30), such as a center bearing isolator mount includes an inner sleeve (52) into which is molded an elastomer/rubber isolator (60), and an insert (70). These components are prepared as a sub-assembly (50) and axially inserted into the opening of an outer bracket (32), whereby fingers (76) deflect radially during insertion and snap-fit radially outward once received through the bracket opening to preclude disassembly. A lower insertion force is required to assemble the components.

28 Claims, 6 Drawing Sheets

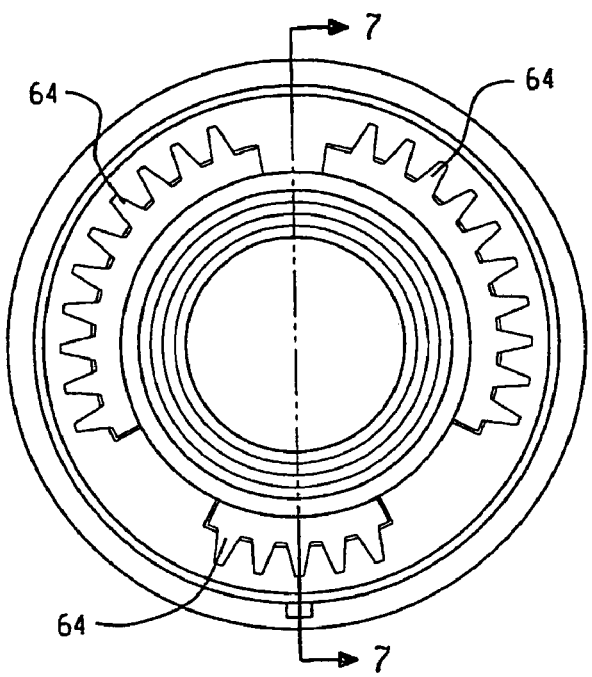
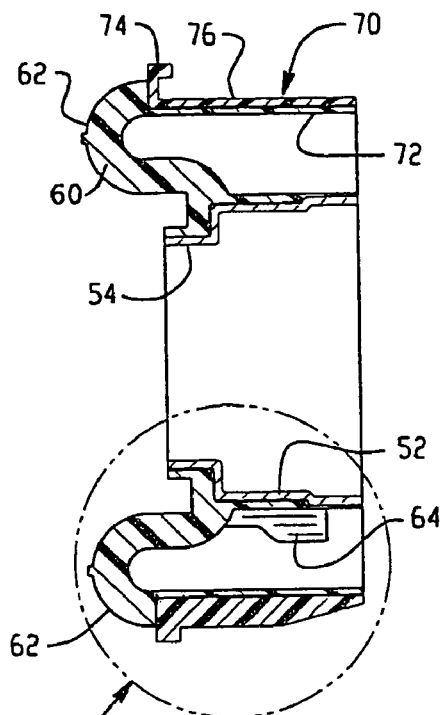
Fig. 6
Fig. 7
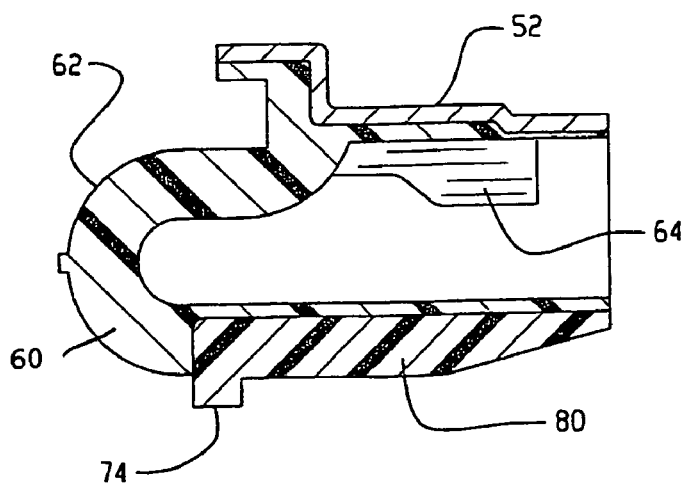
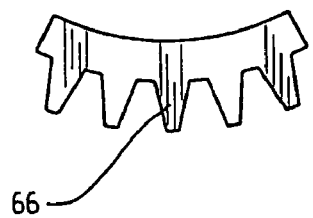
Fig. 8
Fig. 9

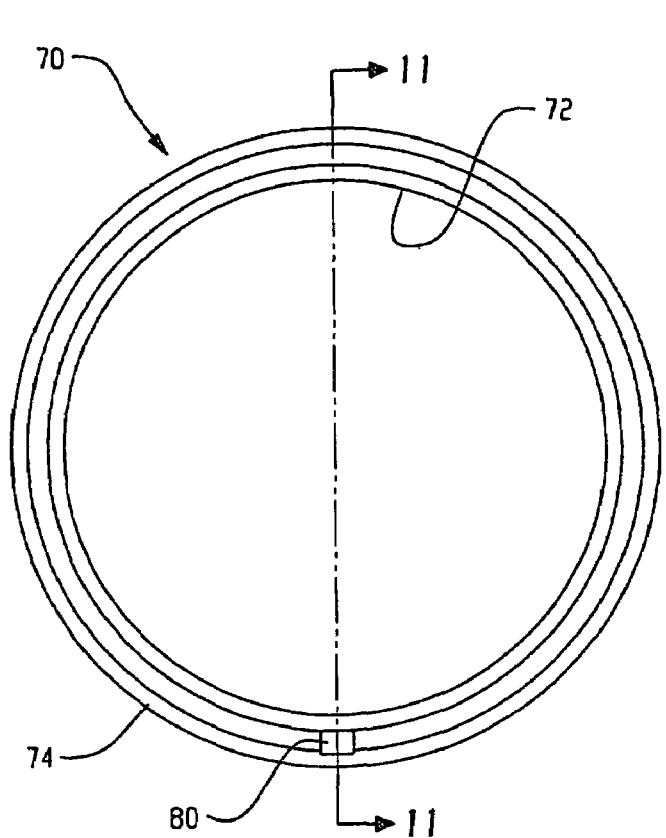
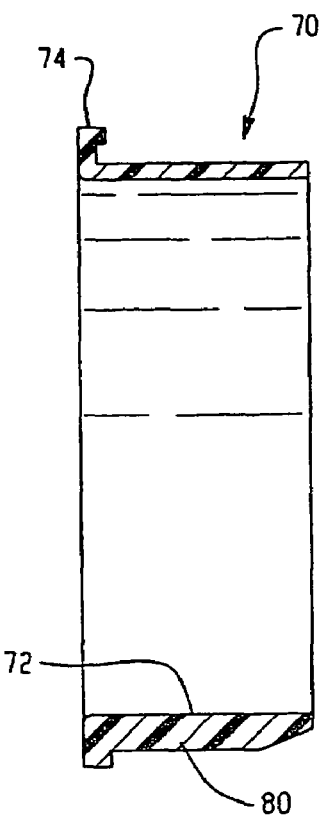
Fig. 10    Fig. 11
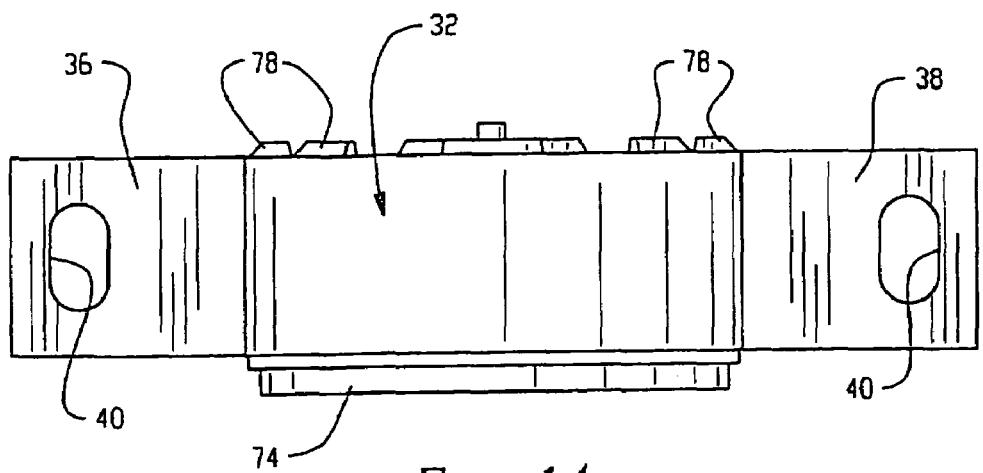
Fig. 14

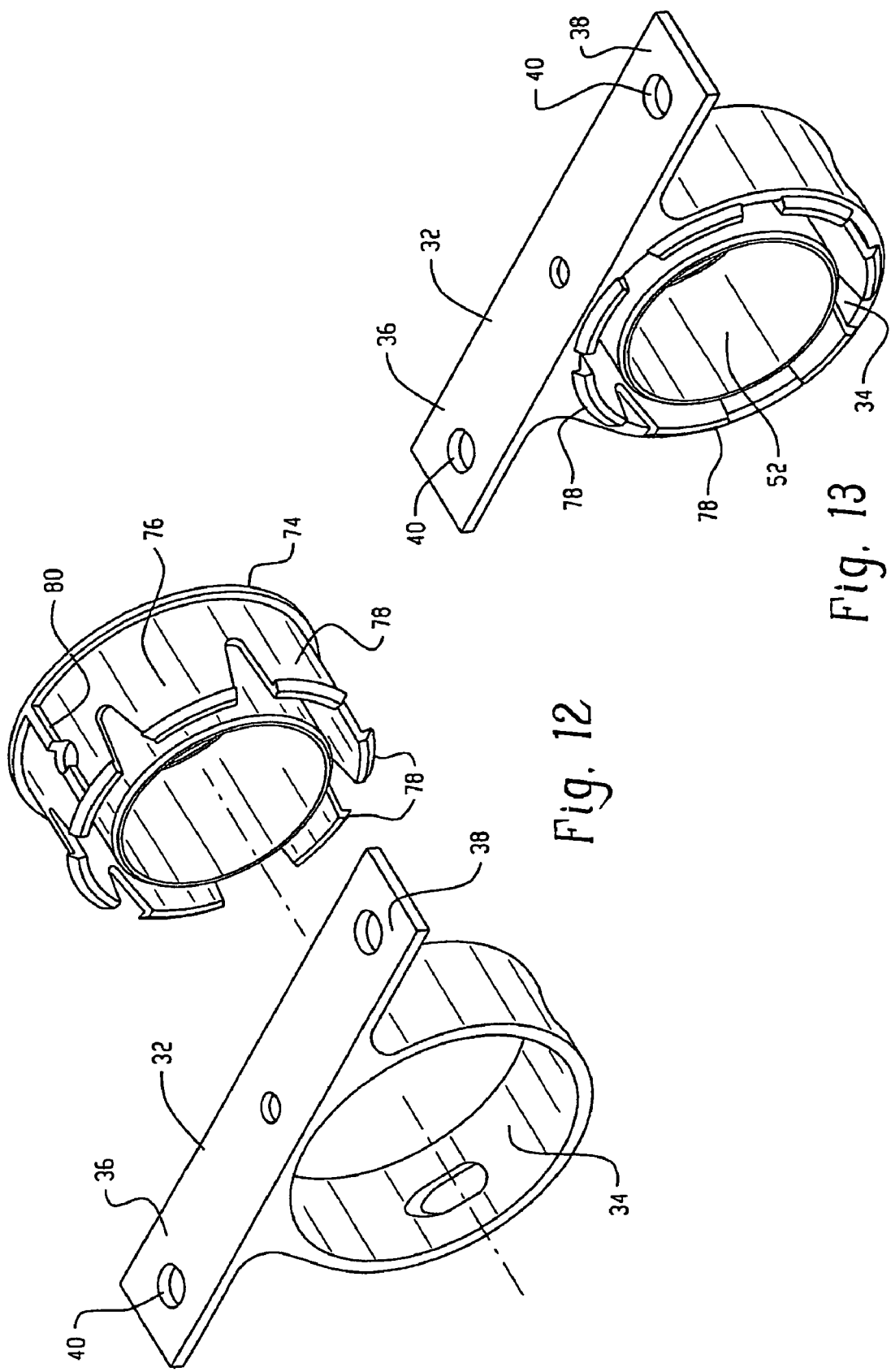

PLASTIC QUICK-SNAP CENTERBEARING ISOLATOR MOUNT AND METHOD OF MANUFACTURING AND ASSEMBLING SAME

BACKGROUND OF THE INVENTION

This application claims priority from U.S. provisional application Ser. No. 60/484,740, filed 3 Jul. 2003, the details of which are incorporated herein by reference.

This invention relates to a vibration isolator or resilient mounting, and more particularly to a center bearing isolator mount assembly for damping vibrations, for example, in a motor vehicle, as well as a method of manufacturing and assembling same.

Resilient mountings or bushings generally include an outer rigid member or outer bracket formed with an aperture that receives an inner sleeve or rigid member, and a resilient, vibration damping material such as an elastomer or rubber between the outer bracket and inner sleeve. For example, it is common in the industry to form a resilient mounting of this type, often referred to as a center bearing isolator mount, by stamping an outer metal (steel) bracket in two or more separate metal stamping operations. Outer bracket components or support flanges are then welded to the bracket. An inner metal sleeve or ring is usually formed in a stamping operation. The isolator, i.e., rubber/elastomer, is mold bonded to the outer bracket and inner sleeve. Alternatively, the isolator is mold bonded to the inner sleeve and press fit into the outer bracket.

One drawback associated with the current industry standard is that a large force is required to press fit the inner sleeve with the mold bonded isolator into the outer bracket. There is also a concern with the potential that the mold bonded isolator/inner sleeve may separate or axially move relative to the outer bracket. Moreover, known isolator mount assemblies have significant weight, and a need also exists to improve the overall cost to manufacture and assemble.

Representative patents generally directed to resilient support or shaft bearings, which include vibration isolators, resilient mounts, and center bearing supports are U.S. Pat. No. 2,939,748-Leach; U.S. Pat. No. 3,639,015-Maas; U.S. Pat. No. 3,743,059-Morse, et al.; U.S. Pat. No. 3,961,829-Bowen, et al.; U.S. Pat. No. 4,083,580-Shaner; U.S. Pat. No. 4,722,618-Matsumoto, et al.; U.S. Pat. No. 5,033,875-Moulinet; and U.S. Pat. No. 5,501,531-Hamaekers.

Accordingly, a need exists for an improved vibration isolator and method of manufacture/assembly that meets or exceeds the performance characteristics of known arrangements, and overcomes various problems of the prior art and methods of manufacture/assembly in a simple, economical way, and in a manner that is easy to manufacture.

SUMMARY OF THE INVENTION

An improved resilient mounting or centerbearing isolator mount is provided that incorporates an insert that facilitates attachment of a molded rubber/elastomer isolator to an outer bracket.

More particularly, a resilient mount assembly includes a rigid, outer bracket having an opening that receives a rigid, inner mount therein. A resilient member or isolator is interposed between the inner mount and the outer bracket for damping vibrations. An insert is fixedly secured to one of the outer bracket and the inner mount, and includes a resilient snap member for selectively securing to the other of the outer bracket and inner mount.

The insert preferably includes plural circumferentially spaced fingers that deflect radially to snap-fit the outer bracket and inner mount together.

In the preferred embodiment, the fingers include locking tabs that preclude separation of the outer bracket and inner mount once assembled.

The elastomeric isolator member is desirably molded to the inner sleeve, and the insert is molded to the isolator member.

A method of manufacturing a preferred vibration isolator assembly includes the steps of providing an outer bracket, mold bonding an inner sleeve and elastomeric isolator together, providing an insert, and inserting the bonded sleeve isolator, and insert into the outer bracket.

Preferably, the mold bonding step includes the step of mold bonding the inner sleeve, elastomeric isolator, and insert together.

A primary benefit of the invention resides in the increased manufacturing throughput by removing the existing large outer bracket from the rubber/elastomer mold and replacing it with a smaller molded plastic component, i.e., increased number of cavities in the mold.

Another advantage is associated with the reduced force required to assemble the mold bonded isolator/inner sleeve subassembly to the outer bracket.

Yet another advantage results from eliminating galvanic corrosion between selected components of the vibration isolator assembly.

Still other features and benefits of the invention will become apparent to those skilled in the art upon reading and understanding the following detailed description.

BRIEF DESCRIPTION OF THE DRAWINGS

FIG. 6 is an elevational view of the molded center bearing subassembly.

FIG. 7 is a cross-sectional view generally along the lines 7-7 of FIG. 6.

FIG. 8 is an enlarged detail view of the encircled portion of FIG. 7.

FIG. 9 is an enlarged detail view of the encircled portion of FIG. 6.

FIGS. 10 and 11 are elevational and cross-sectional views of the insert, respectively.

FIGS. 12 and 13 are perspective views of the disassembled and assembled components.

FIG. 14 is a top plan view of the assembled centerbearing isolator mount assembly.

DETAILED DESCRIPTION OF THE INVENTION

Figure 1:
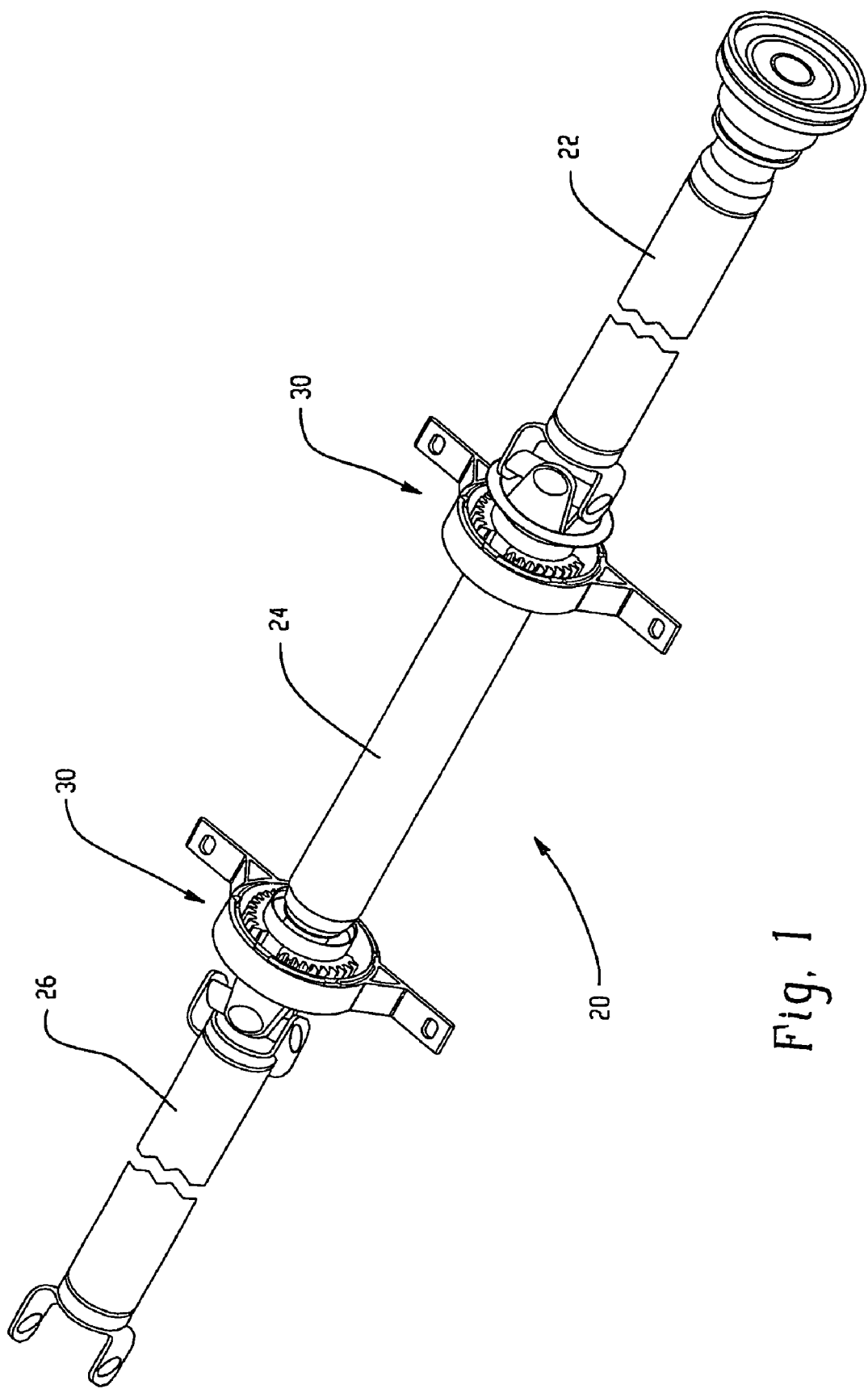
FIG. 1 is a perspective view of a propshaft assembly incorporating center bearing isolator mount assemblies of the present invention.

Turning first to FIG. 1, a rotary shaft such as a propshaft 20 is shown and includes three distinct portions, namely, front propshaft 22, a mid propshaft 24, and a rear propshaft 26. These portions are assembled together in a known manner to transmit rotary force from one end to the other in a manner well known in the art, the details of which are not provided herein nor necessary to a full and complete understanding of the present invention. As will be appreciated, however, the mid propshaft portion is supported adjacent opposite ends thereof by resilient mountings or bushings, more specifically referred to as center bearing isolator mount assemblies 30. As illustrated in FIG. 1, each of the bearing isolator mount assemblies is identical to the other, although variations are envisioned, some of which are described in greater detail below.

Figure 2:
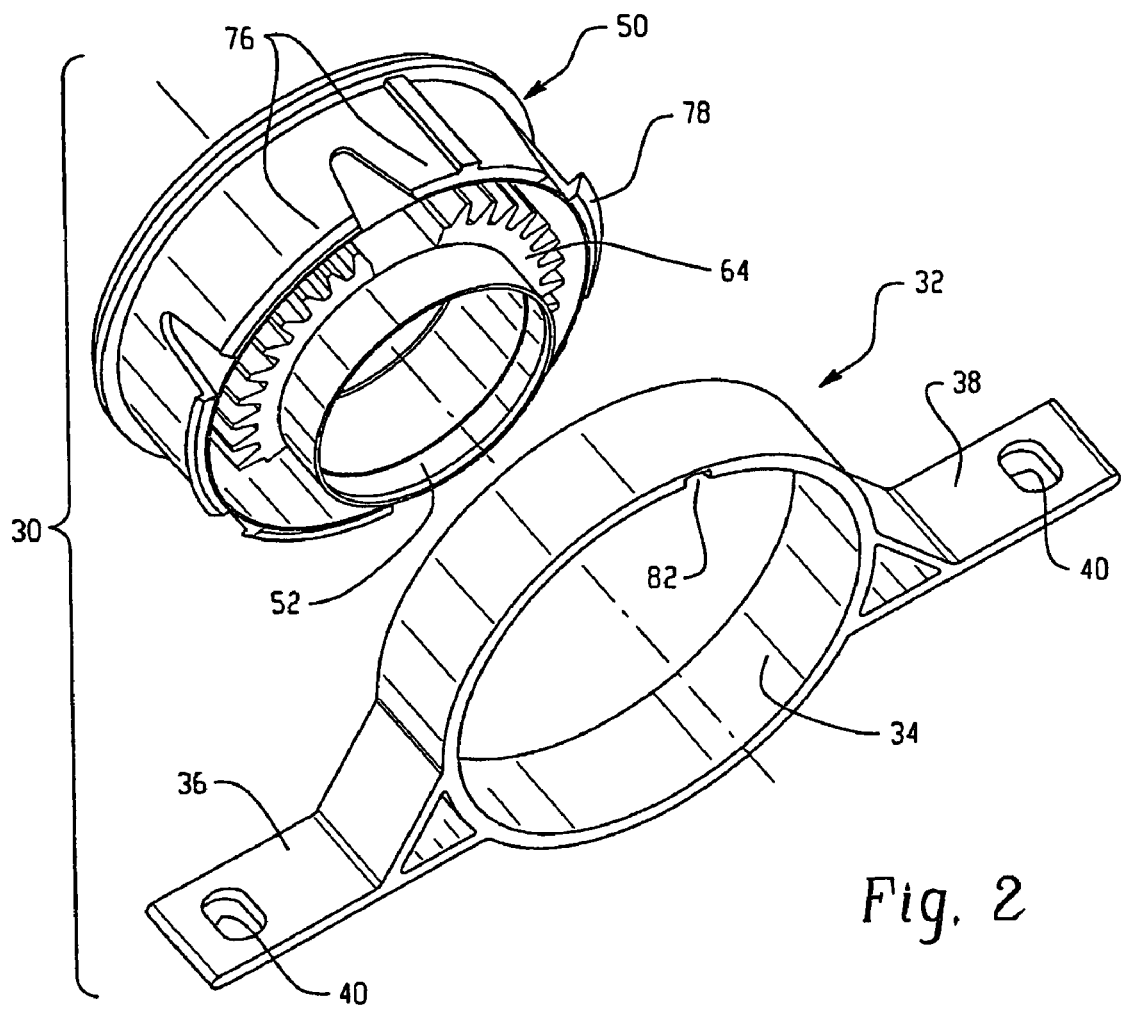
FIG. 2 is a perspective view of a top mounted center bearing isolator mount assembly.
Figure 3:
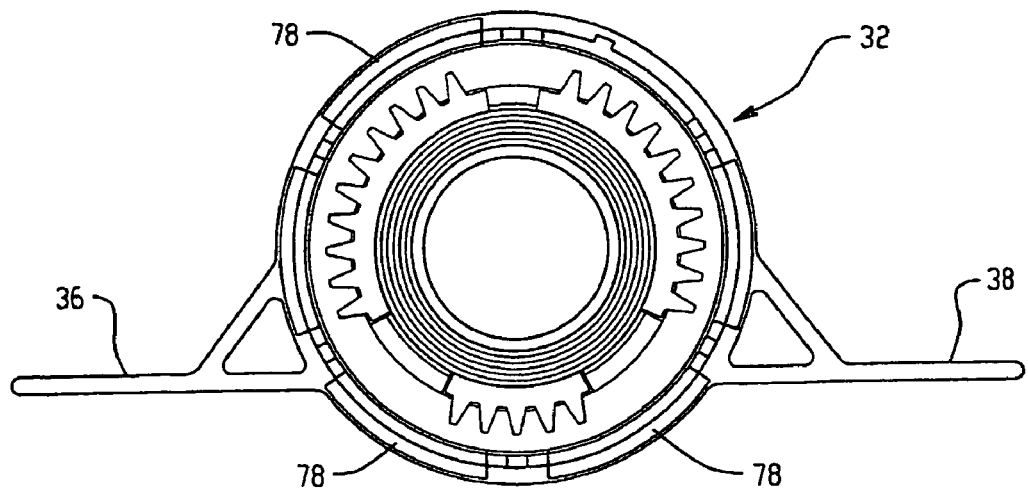
FIG. 3 is an elevational view of the assembled components of FIG. 2.
Figure 4:
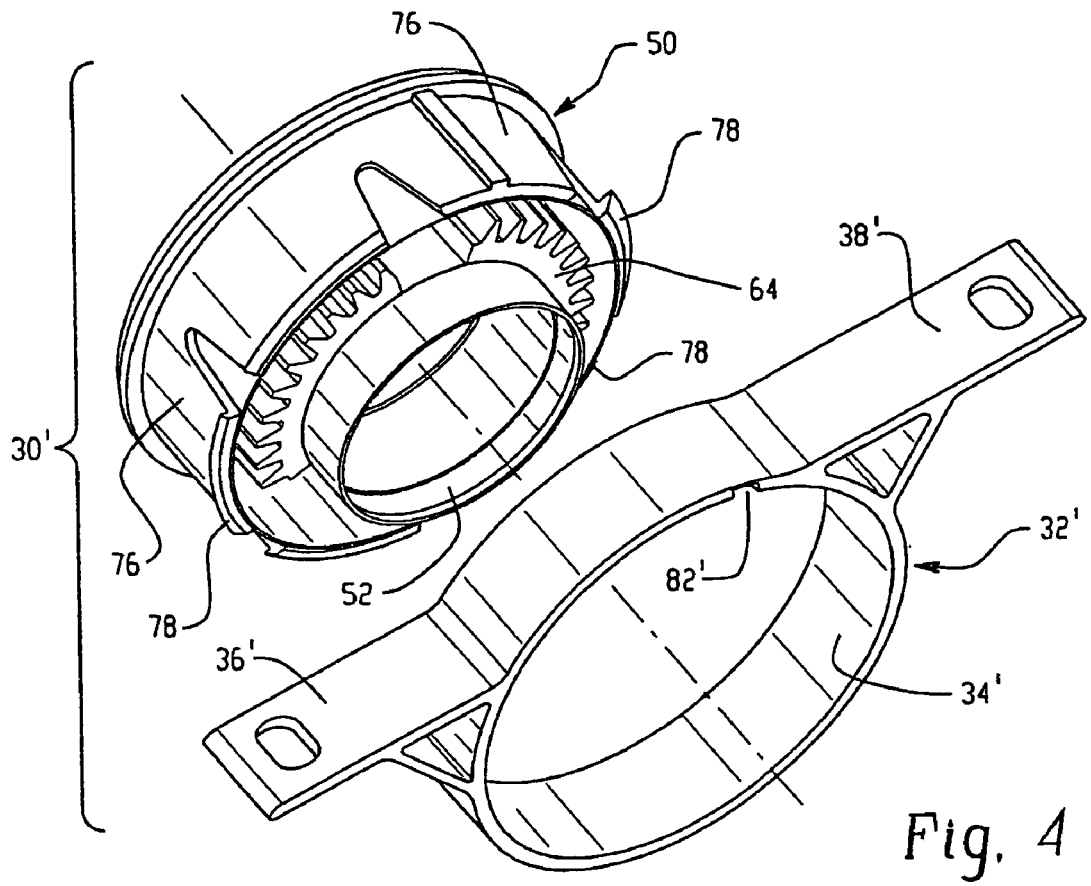
FIG. 4 is a perspective view of a hanger mounted center bearing isolator mount assembly.
Figure 5:
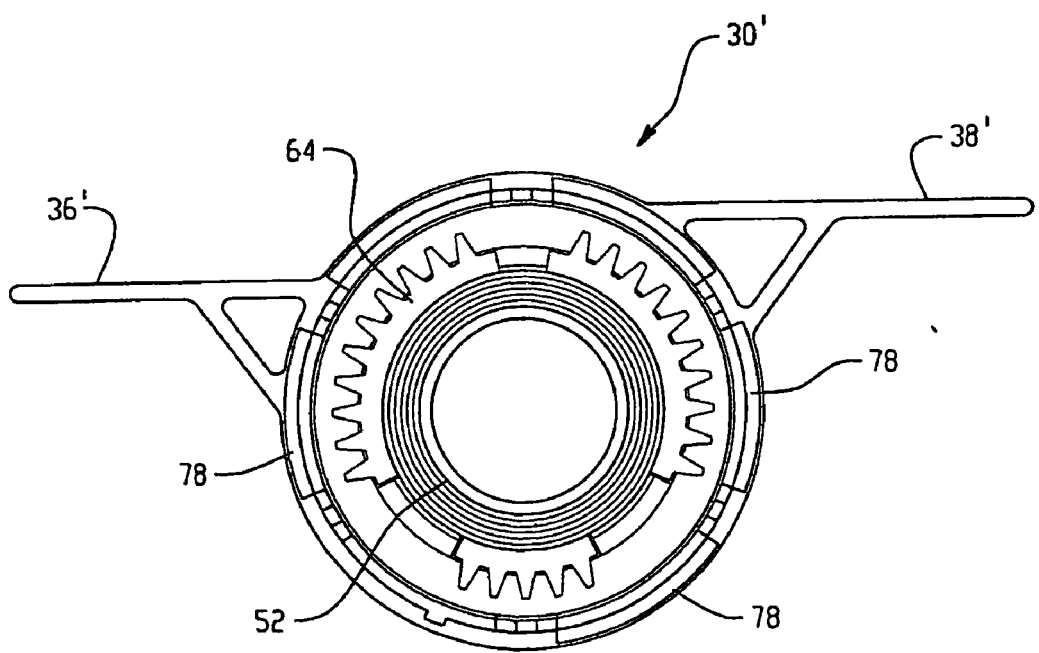
FIG. 5 is an elevational view of the assembled components of FIG. 4.

With continued reference to FIG. 1, and additional reference to FIGS. 2 and 3, the bearing isolator mount assembly includes a rigid first member or outer bracket 32. The outer bracket has an aperture or opening 34 extending axially therethrough. In this embodiment, the outer bracket is a generally hollow, cylindrical configuration or annulus having support members 36, 38 extending outwardly therefrom for securing the outer bracket to an associated frame of a motor vehicle (not shown). Again, the particular details of the mounting arrangement are generally known in the art. The bracket flanges 36, 38 are shown as extending outwardly in a symmetrical manner in FIG. 3, however, other configurations can also be used without departing from the scope and intent of the present invention. For example, as illustrated in FIGS. 3 and 4, like numerals with a primed suffix (') identify like elements and non-symmetrical flanges 36', 38' extend outwardly from the bracket.

It is preferable that the outer bracket be formed of a rigid material such as a metal. In a preferred arrangement, the metal is aluminum which is extruded into the desired conformation of the bracket. The preferred arrangement, though, should not limit the invention since it is understood that other stamped, cast, or other materials or construction may be used. The flange portions 36, 38 also preferably include openings 40 that receive a fastener (not shown) for securing the outer bracket to the associated vehicle. The aperture 34 is preferably centered in the outer bracket and dimensioned to receive a sub-assembly 50.

The sub-assembly 50 (FIGS. 6-9) includes a rigid member or inner sleeve 52, which is generally annularly shaped and includes an opening 54 therethrough dimensioned for bearing receipt over the mid propshaft. As is generally known in the art, a resilient material such as an elastomer or rubber 60 is provided between the inner sleeve and the outer bracket. Preferably, the rubber is mold bonded to an outer perimeter of the inner sleeve. As best illustrated in FIGS. 7 and 8, the elastomer extends over substantially the entire length of the inner sleeve and includes an intermediate section 62 that extends axially outward from the inner sleeve as it proceeds radially outward. This configuration is generally known in the art. Likewise, circumferential portions 64 have generally radially outward extending serrated portion 66 (FIG. 9). Again, in a manner generally known in the art the serrated portions provide good flexibility and clearance therearound during normal static loading. If an increased static or dynamic load is encountered, the radial spring rate of the elastomeric material is increased when serrated portion is radially compressed and increases the radial stiffness of the assembly.

Also received in the annular space between the inner sleeve and the outer bracket is an insert 70. In the preferred arrangement, the insert is formed of a polymer or plastic material. In addition to being shown in FIGS. 6-8, the insert is also individually illustrated in FIGS. 10 and 11. The insert has an axial length slightly greater than that of the inner sleeve and an inner opening 72 dimensioned to define an annular space with the outer wall of the inner sleeve. The polymer construction, such as a glass reinforced fiber incorporated in a nylon, is molded to the elastomeric isolator in a preferred embodiment. In this manner, the inner sleeve, isolator, and insert are joined together to form the sub-assembly 50. The insert includes a continuous shoulder 74 at one end and circumferentially spaced fingers 76 (FIG. 12) having locking tabs 78 that extend radially outward therefrom at the other end. The insert further includes an axially extending key 80 that cooperates with a recess or key way 82 (FIGS. 2-5) that rotationally aligns the sub-assembly 50 in the proper circumferential orientation relative to the outer bracket. This facilitates assembly during axial insertion of the sub-assembly into the opening 34 of the outer bracket.

As illustrated in FIGS. 12-14, upon axial insertion of the sub-assembly into the outer bracket, the fingers 76 deflect radially inward under the imposed axial force. The locking tabs then flex radially outward once received through the outer bracket opening and snap-fit radially outward to axially engage the opposite face of the outer bracket. Likewise, shoulder 74 abuts against the opposite face of the outer bracket. In this manner, the plastic insert provides a quick-snap or snap-to-fit assembly of the inner sleeve, rubber isolator, and insert sub-assembly 50 into the outer bracket. The cooperation of locking tab 78 on one face of the outer bracket and the radial shoulder 74 on the opposite face of the outer bracket also prevents relative axial movement or "walk-out" of the sub-assembly relative to the outer bracket.

By manufacturing the insert from plastic, galvanic corrosion is also prevented between the components. The inner steel insert is isolated from the outer extruded aluminum bracket and the mold bond rubber/elastomer effectively dampens vibrations and prevents the vibrational forces from being transferred from the inner sleeve to the outer bracket. A substantially smaller installation force is required for inserting the sub-assembly into the outer bracket. This new arrangement also substantially reduces the weigh and cost over the existing centerbearing isolator mount assemblies.

Although the invention has been described relative to a center bearing isolator mount assembly, it will be appreciated that its features may be applied to other vibration control products that require an attachment feature between a bracket or sleeve to molded rubber/elastomer. Likewise, where a positive stop is required to prevent relative axial movement between these components, it is clear that this feature may be useful in such an environment.

It will also be appreciated that by removing the larger outer bracket from the rubber/elastomer mold, and replacing it with a smaller molded plastic component (insert), that an increased number of cavities may be provided in the rubber mold. This increases manufacturing throughput. In addition, the reduced force required to assemble the sub-assembly into the outer bracket is substantially less than the current industry standard of press fitting the inner sleeve and isolator into an outer bracket. Although plastic is preferred as the insert material, it will be further appreciated that still other materials can be used without departing from the scope of the present invention.

The invention has been described with reference to the preferred embodiment. Modifications and alterations will occur to others upon reading and understanding this specification. It is intended to include all such modifications and alterations in so far as they come within the scope of the appended claims or the equivalents thereof.

Having thus described the invention, it is now claimed:

1. A resilient mount assembly comprising:
a rigid, outer bracket having an opening therethrough, the bracket adapted to be mounted to a first member of an associated vehicle;

a rigid, inner mount dimensioned for receipt in the outer bracket;

a resilient member interposed between the inner mount and the outer bracket for damping vibrations therebetween; and an insert fixedly secured to one of the outer bracket and the inner mount, and including a resilient snap member for selectively securing to an other of the outer bracket and inner mount.

2. The invention of claim 1 wherein the insert includes plural circumferentially spaced fingers that deflect radially to snap-fit the outer bracket and inner mount together.

3. The invention of claim 2 wherein the fingers include locking tabs that preclude separation of the outer bracket and inner mount once assembled.

4. The invention of claim 1 wherein the insert is molded to the resilient member.

5. The invention of claim 4 wherein the resilient member is molded to the inner mount.

6. The invention of claim 4 wherein the insert is a polymer.

7. The invention of claim 1 wherein the resilient member is molded to the inner mount.

8. The invention of claim 1 wherein the inner mount has a generally cylindrical conformation and is received in the outer bracket thereby defining an annular space therebetween that receives the resilient member.

9. The invention of claim 1 wherein the outer bracket and insert include mating key portions for aligning the insert with the outer bracket.

10. The invention of claim 1 wherein the insert includes a plurality of circumferentially spaced, radially outwardly biased fingers having respective locking tabs thereon that axially engage one end of the bracket.

11. The invention of claim 1 wherein the bracket is metal.

12. The invention of claim 11 wherein the bracket is an extruded aluminum.

13. The invention of claim 1 wherein the inner mount is metal.

14. The invention of claim 1 wherein the resilient member is rubber.

15. A center bearing isolator mount assembly comprising:

an outer bracket adapted to be mounted on an associated vehicle, the outer bracket including an aperture extending therethrough;

an inner sleeve received in the outer bracket defining an annular space therebetween;

an insert member secured to the inner sleeve for receipt in the annular space and having a plurality of circumferentially spaced, outwardly biased fingers that engage the outer bracket; and an elastomeric isolator member received in the annular space for providing vibration damping and isolation between the inner sleeve and outer bracket.

16. The center bearing isolator mount assembly of claim 15 wherein at least some of the fingers include locking tabs for precluding removal of the inner sleeve to the outer bracket.

17. The center bearing isolator mount assembly of claim 15 wherein the insert member is molded to the inner sleeve.

18. The center bearing isolator mount assembly of claim 17 wherein the isolator member is molded to the insert member.

19. The center bearing isolator mount assembly of claim 15 wherein the insert is a polymeric material.

20. The center bearing isolator mount assembly of claim 19 wherein the elastomeric isolator member is molded to the inner sleeve, and the insert is molded to the isolator member.

21. The center bearing isolator mount assembly of claim 15 wherein the isolator member has a surface portion which includes a plurality of circumferentially spaced protrusions.

22. The center bearing isolator mount of claim 21 wherein the circumferentially spaced protrusions are in the form of circumferential projections that are deformable and formed with a profile to provide flexibility in the radial direction.

23. The center bearing isolator mount of claim 21 wherein the protrusions are arranged to extend radially outward from the inner sleeve member toward the insert member.

24. The center bearing isolator mount of claim 15 wherein the outer bracket member is aluminum.

25. The center bearing isolator mount of claim 15 wherein the insert member is a non-metallic material to prevent galvanic corrosion.

26. The center bearing isolator mount of claim 15 wherein the inner surface of the annular ring and the insert member have mating, keyed configurations that provide for slidable insertion of the insert member in the annular ring for limiting relative movement of the insert member and providing an interlocking feature that allows the insert member and annular ring to merge and function as a single component.

27. A method of manufacturing a vibration isolator assembly for damping vibrations having an outer bracket, an insert, an inner sleeve, and an elastomeric isolator, the method comprising the steps of:

providing an outer bracket;

mold bonding an inner sleeve and elastomeric isolator together;

providing an insert; and inserting the bonded sleeve, isolator, and insert into the outer bracket.

28. The method of claim 27 comprising the further step of mold bonding the inner sleeve, elastomeric isolator, and insert together.

* * * * *